(12) United States Patent
Wermelinger

(10) Patent No.: US 9,664,313 B2
(45) Date of Patent: May 30, 2017

(54) MODULAR FITTING

(75) Inventor: Joerg Wermelinger, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 162 days.

(21) Appl. No.: 13/985,010

(22) PCT Filed: Jan. 17, 2012

(86) PCT No.: PCT/EP2012/050590
§ 371 (c)(1),
(2), (4) Date: Oct. 3, 2013

(87) PCT Pub. No.: WO2012/110269
PCT Pub. Date: Aug. 23, 2012

(65) Prior Publication Data
US 2014/0020811 A1    Jan. 23, 2014

(30) Foreign Application Priority Data
Feb. 15, 2011  (EP) .................... 11154496

(51) Int. Cl.
| *F16L 13/02* | (2006.01) |
| *B29C 65/02* | (2006.01) |
| *B29C 65/00* | (2006.01) |
| *F16L 43/00* | (2006.01) |
| *F16L 47/32* | (2006.01) |

(Continued)

(52) U.S. Cl.
CPC ............ *F16L 13/02* (2013.01); *B29C 65/02* (2013.01); *B29C 66/1142* (2013.01); *B29C 66/131* (2013.01); *B29C 66/5223* (2013.01); *B29C 66/52241* (2013.01); *B29C 66/52292* (2013.01); *F16L 43/008* (2013.01); *F16L 47/32* (2013.01); *B29C 66/71* (2013.01); *B29C 66/8322* (2013.01); *B29C 66/91221* (2013.01); *B29K 2023/06* (2013.01); *B29K 2023/12* (2013.01); *B29K 2027/06* (2013.01); *B29K 2055/02* (2013.01); *B29K 2077/00* (2013.01); *B29K 2101/12* (2013.01); *B29L 2031/243* (2013.01);

(Continued)

(58) Field of Classification Search
CPC .......... F16L 13/02; F16L 43/008; F16L 47/32
See application file for complete search history.

(56) References Cited

U.S. PATENT DOCUMENTS 1,801,171 A  *  4/1931  Mueller et al. ............ 285/289.5
2,157,274 A  *  5/1939  Williams ................. 285/133.11

(Continued)

FOREIGN PATENT DOCUMENTS

CH       398211 A      8/1965
CH       399845 A      9/1965

(Continued)

*Primary Examiner* — David E Bochna
(74) *Attorney, Agent, or Firm* — Bachman & LaPointe, P.C.

(57) ABSTRACT

A fitting (1) of weldable, thermoplastic material of a modular structure, comprising a number of elements (2, 3, 9, 10, 11, 12), at least one main element (2, 9) and at least one connecting element (3, 10, 11, 12), characterized in that the elements (2, 3, 9, 10, 11, 12) have end faces (4, 5) at right angles to the center axis (8), and the elements (2, 3, 9, 10, 11, 12) are welded to one another exclusively at the end faces (4, 5).

18 Claims, 4 Drawing Sheets

(51) Int. Cl.
*B29K 23/00* (2006.01)
*B29K 27/06* (2006.01)
*B29K 55/02* (2006.01)
*B29K 77/00* (2006.01)
*B29K 101/12* (2006.01)
*B29L 31/24* (2006.01)

(52) U.S. Cl.
CPC ........ *B29L 2031/246* (2013.01); *Y10T 156/10* (2015.01)

(56) References Cited

U.S. PATENT DOCUMENTS

| | | | | |
|---|---|---|---|---|
| 2,555,256 A | * | 5/1951 | Tyson | 285/288.1 |
| 3,392,994 A | * | 7/1968 | Moore | 285/133.11 |
| 3,499,669 A | * | 3/1970 | Hait | 285/133.11 |
| 3,690,702 A | * | 9/1972 | Moore et al. | 285/133.3 |
| 3,873,391 A | | 3/1975 | Plauka et al. | |
| 4,071,395 A | | 1/1978 | McElroy | |
| 4,627,646 A | * | 12/1986 | Kessel | 285/114 |
| 4,954,299 A | | 9/1990 | Greig et al. | |
| 5,156,420 A | * | 10/1992 | Bokor et al. | 285/21.2 |
| 5,770,006 A | | 6/1998 | Andrew et al. | |
| 5,776,293 A | | 7/1998 | Levingston | |
| 5,958,172 A | | 9/1999 | Levingston | |
| 5,975,590 A | * | 11/1999 | Cowan et al. | 285/133.11 |

FOREIGN PATENT DOCUMENTS

| | | |
|---|---|---|
| DE | 2740742 A1 | 3/1978 |
| EP | 0256825 A2 | 2/1988 |
| EP | 0852996 A2 | 7/1998 |
| JP | 5-256391 A | 10/1993 |
| JP | 8-118472 A | 5/1996 |
| KR | 20100098792 A | 9/2010 |
| WO | 0234501 A1 | 5/2002 |

\* cited by examiner

MODULAR FITTING

BACKGROUND OF THE INVENTION

The invention relates to a fitting made of weldable, thermoplastic material and having a modular construction, containing a plurality of elements, at least one main element and at least one connection element.

Fittings are understood to be pipeline connectors which connect pieces of pipe to one another and also perform further functions in the process, e.g. changing the direction of the pipe sections which are to be connected. In order to lay a pipeline, it is necessary to use fittings, be this in order to realize branches in the pipelines or in order to deflect the lines by installing bends therein. As far as plastics pipelines are concerned, such fittings are usually produced by injection molding. For reasons relating to cost, injection molding is an ideal method of producing fittings as long as large numbers are required. Injection molding requires an injection mold, which is very complex to produce and is therefore costly. In order to ensure that the injection mold pays for itself, it is therefore necessary to produce large numbers of parts. It is only in this way, by providing large numbers of the parts which are to be produced, that the mold cost per individual part can be kept to a very low level. However, in the case of small numbers, the price for an individual part would be rendered so high by the additional payback costs of the injection mold that an individual part would no longer be affordable or this would no longer be a tenable option for the manufacturers of such parts, since the parts would not cover the production costs. Such fittings usually have large diameters, which are only seldom used.

It is known for it to be possible for such large-dimension fittings made of weldable plastics to be welded together from pipe segments, that is to say that the fitting comprises a plurality of individually cut-to-shape pipes, which are then welded together. For example for a tee fitting, existing pipes are split and/or cut to shape such that two pipes have 45° miters cut over half their circumference at one end in each case, these miters are then welded together, and the pipe which is used as the centerpiece of the tee fitting is first of all mitered to a point in order to be welded to the two pipes offset at 90° in the direction of the centerpiece. This gives rise to a weld seam which runs in the corners of the tee fitting. A fitting produced in this way is not suitable for withstanding nominal pressures since the seams in these positions are exposed to extremely high loading and would therefore not meet the requirements. In addition, production is very time-consuming on account of the corresponding preparation of the pipes which are to be welded.

U.S. Pat. No. 3,873,391 discloses a method of producing a plastics pipe fitting, for example a tee fitting. The method comprises the shaping of the plastics pipe sections by contours with complementary miters being produced and by the desired fitting being formed by virtue of the complementary plastics pipe sections being joined together. The peripheries are temporarily secured in the assembled position by, for example, adhesive. A liquid mixture, for example polyurethane elastomer, is then applied, preferably by spraying, to the outer surface in the region of the mitered contour. Setting or curing gives rise to a tough, but slightly elastic layer, which holds the plastics pipe sections together.

Such fittings are disadvantageous, on the one hand, on account of their high-outlay production and, on the other hand, on account of them not being suitable for high pressures as a result of the methods used for connecting the plastics pipes.

It is an object of the invention to propose a plastics fitting, and an associated production method, which is suitable, even in terms of cost, for a small-batch production and meets the requirements of the compressive strength and the surface nature in the pipeline interior.

SUMMARY OF THE INVENTION

The foregoing object is achieved according to the invention in that the elements have end surfaces running at right angles to the center axis, and the elements are welded to one another exclusively on the end surfaces.

Since the fittings only have weld seams which run only around the circumference, they meet the stringent requirements in respect of the nominal compressive strength and can readily be installed in pipe systems, which has not been possible up until now using the fitting made of welded pipe segments, since these did not meet the requirements in respect of nominal compressive strength. This is because for example their weld seams, running longitudinally along the circumference, do not withstand high pressures. Furthermore, this geometric construction gives rise to only small weld seams in the case of which there is barely any need to rework the internal diameter, since the small size of the weld seams causes barely any resistance in the line. However, if there is, indeed, a need to remove the weld seams from the inside, this can be done very quickly and straightforwardly.

The modularity of the fitting allows the production of a large number of different variants of fitting, without this adversely affecting the costs. Even small batches can thus be produced at economically viable costs. The main element, which serves as a basic block, is produced by injection molding, it being possible for different connection elements, in accordance with requirements, to be welded thereto. For example, a main tee part is injection molded, and rectilinear connection elements, produced for example by injection molding, are welded thereto, and it is also possible for reworked pipe sections to be used as the rectilinear connection element. Furthermore, connection elements which have been produced by another method are also suitable here. It is thus possible to dispense with expensive injection molds for a large number of connection elements or else, in production by injection molding, to keep the costs at a very low level by way of a large number of the connection elements being produced, since they fit on all types of main element with the corresponding diameter.

In order that the compressive strength and the loading capability in the seam region can be greater than has been the case up until now for welded fittings, the wall thicknesses of the main element and of the connection element are thicker in the region of the separating location and/or of the seam between the main element and connection element than for separating locations and/or seams between the connection element and pipeline which is to be connected.

In order for the main elements to be readily compatible with the connection elements, it is necessary for the separating locations to have the same end-surface geometries, for which reason the end surfaces of the connection elements and those of the main elements are round.

The fittings according to the invention preferably have a minimum nominal diameter of 300 mm, wherein the nominal diameter relates to the internal diameter. For smaller dimensions, it is indeed possible to realize a modular fitting, but the large number of fittings with smaller internal diameters renders a corresponding injection mold, with the finished fitting, inexpedient for reasons relating to cost, and therefore the fitting according to the invention is hardly used with internal diameters of less than 300 mm.

A preferred embodiment consists in producing the fittings from one of the following plastics: PVDF, PP, PE, PVC, ABS, PB, PA, PFA, or ECTFE, since these are readily suitable for welding and are known to be standard materials in pipeline construction.

A further preferred embodiment of the fitting according to the invention consists in that the main element is T-shaped. A tee fitting which is inserted into a pipeline as a branch is prefabricated to completion at the factory by virtue of the corresponding and/or required connection elements being welded onto the main element. Any desired connection element can be welded onto the main element, the only requirement being that they have the same diameter at the separating location.

A further preferred embodiment consists in that the main element is in the form of an arcuate segment, preferably an arcuate segment of 45°. This embodiment makes it possible for the pipeline to be laid individually in any direction. It is also possible, for example, for two arcuate main elements to be welded to one another to give a relatively large arcuate-angle element. It is only then that a connection element is joined to the respective ends of the welded-together main elements. The angles of the prefabricated arcuate segments and/or main segments can be selected as desired, although there is also the case here that the main element is usually produced by injection molding, and it is therefore necessary for a separate injection mold to be produced for each arcuate segment of a different angle. An acute angle, or a small angle, of an arcuate segment makes possible, by virtue of arcuate segments and/or main elements being welded together, a multiplicity of different arcuate-angle elements, which can be joined together, using just one injection mold. Of course, it is also the case here that this gives rise to a correspondingly large number of weld seams.

It is additionally advantageous if different embodiments of connection elements are produced, that is to say if they are designed in accordance with requirements. If, for example, a pipeline which has to be connected to an T-shaped main element has a smaller diameter than that already present in the T-shaped main element, a reducing connection element can be welded to the T-shaped main element. The reducing connection element thus makes it possible to connect even pipelines which have a smaller diameter. Of course, it is also conceivable to have a connection element which is suitable for connection to a pipe with a larger diameter, for example an expansion connection element.

A further conceivable embodiment of a connection element is also an instrument connection element, which makes it possible to connect an instrument such as, for example, a flow sensor or a temperature sensor.

Use is usually made of rectilinear connection elements, which, on account of their variety of production methods, for example injection molding, severing of a piece of pipe, etc., can be coordinated with the numbers required and are thus highly advantageous for reasons relating to cost.

A further advantage of the modular construction of the fitting according to the invention consists in that it is possible to weld directly to the main element a connection element which is designed as a welding neck with flange, for example for a valve. This gives rise to very compact installation dimensions since the distance between the end surfaces of the welding neck and the center axis, running parallel thereto, of the T-shaped main element is very short and the appropriate welding neck can be welded directly to the end surface of the T-shaped main element. Conventional tee fittings have relatively long connection stubs since the finished tee fitting is designed with rectilinear connections to which a line is normally connected. If this is not the case, an appropriate adapter part is fitted thereon, as a result of which the installation dimensions of the desired tee fitting, with corresponding coordination with the follow-on component or the follow-on fitting, is extended to a pronounced extent. Such a long distance can, for example, adversely affect the water quality. Since, in the case of branches which do not have constant flow through them, the water becomes stagnant in such dead spaces, and germs therefore readily accumulate there, these germs being entrained with the medium in the event of subsequent flow through the branch, for which reason short connection lengths, such as those provided by the modular construction, are very advantageous. In order to keep such dead spaces as small as possible, the distance which extends between the end surface of the preassembly connection element and/or the welding neck in the direction of the center axis, running parallel thereto, is shorter than the nominal diameter of the corresponding fitting.

Of course, yet further embodiments of connection element are conceivable, and can be implemented. The modularity of the fitting means that the embodiments are subject to hardly any limits.

The method of the present invention consists in that the elements have end surfaces running at right angles to the center axis, and the elements are welded to one another exclusively on the end surfaces.

The method consists in that the elements are welded to one another in the factory exclusively along the circumference of the end surface running at right angles to the center axis. Since the weld seam is still produced in the factory, and thus prefabricated, it is possible to ensure that optimum conditions prevail for a good weld connection, which has a positive effect on the compressive strength of the fitting and/or of the weld seam. Furthermore, the fitting can be used directly when the pipeline is being assembled, and can be welded together using a normal welding machine.

BRIEF DESCRIPTION OF THE DRAWINGS

Exemplary embodiments of the invention will be described with reference to the Figures, wherein the invention is not restricted just to the exemplary embodiments. In the Figures.

DETAILED DESCRIPTION

Figure 1:
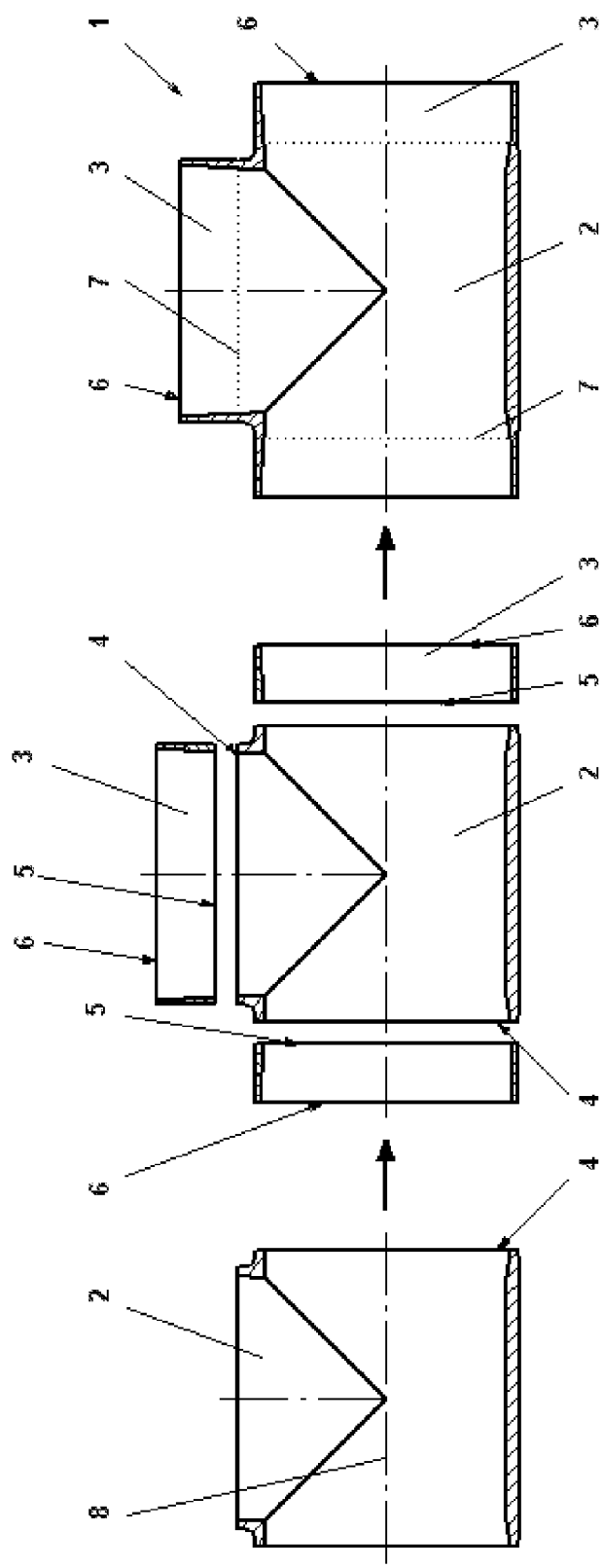
FIG. 1 shows a sectional view of the modular production of the fitting, illustrated in steps by way of a T-shaped main element.

FIG. 1 shows the modularity of, and the steps for producing, a fitting according to the invention. The left-hand image illustrates a main element 2, which is T-shaped. The main element 2 is usually produced by injection molding, since the main element 2 forms a kind of basic block which withstands increased loading and to which differently designed connection elements 3 or further main elements 2 are welded. The central image illustrates, in addition, the connection elements 3 which can be welded to the main element 2. In the case of the embodiment illustrated, use is made of rectilinear connection elements 3. Of course, it is possible to join on any embodiment of connection element 2 with the corresponding diameter, for example a reducing connection element 10 or an instrument connection element 11, etc. The connection elements 3 are welded by way of their end surface 5, which is round and runs at right angles to the center axis 8, to the end surface 4 of the main element 2, 9, this latter end surface likewise being round and running at right angles to the center axis 8. The connection element 3 is designed such that the wall thickness increases and/or is thicker (not illustrated) at the end surfaces 5. By virtue of the fittings produced under optimum conditions in the factory have weld seams produced in the best possible manner, and it is thus possible to reduce, if not even basically avoid, any stressing which occurs. This, in turn, ensures a high level of operational reliability. The end surfaces 6 of the connection elements 3 are connected to the pipeline upon installation of the fitting 1. The image on the right-hand side in FIG. 1 shows the fitting 1 welded to completion in the factory.

Figure 2:
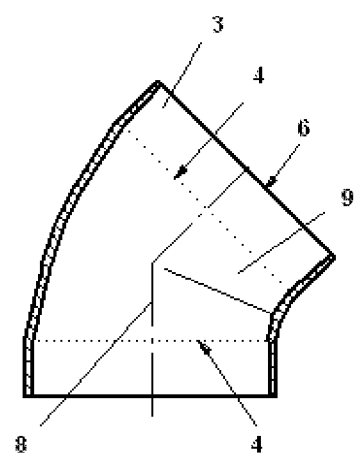
FIG. 2 shows the sectional view of an arcuate main element.

FIG. 2 shows a further embodiment of a main element 9. This main element 9 is of arcuate design, in order to provide for changes in direction in pipeline systems. The depicted arcuate segment and/or main element 9 has a 45° angle, which in many cases constitutes an ideal arcuate segment for deflecting the line and/or the system. Of course, it is possible to produce any desired angle dimension, the only requirement being an appropriate injection mold produced beforehand. It is expedient to use a dimension which can be used frequently. FIG. 2 clearly shows the thickening of the wall thickness in the direction of end surfaces 4, the latter serving, as in the case of the aforementioned T-shaped main elements 2, to create a weld seam which can be subjected to relatively high loading. It is likewise possible to weld two main elements 9 directly to one another. The modularity of this system allows all connection variants, the only requirement being for all the connections to have the same connection diameters.

Figure 3:
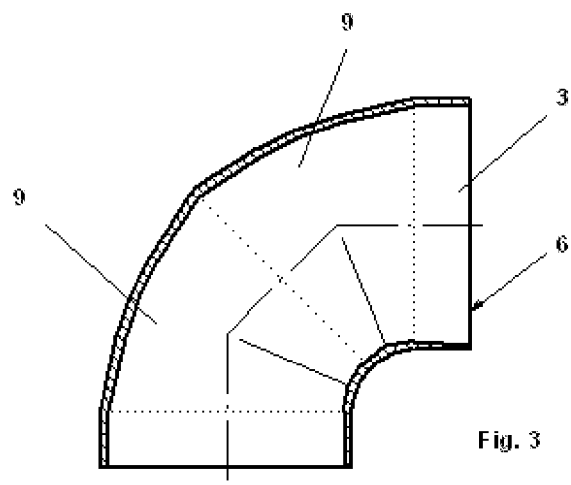
FIG. 3 shows the sectional view of two interconnected arcuate main elements, each having an angle of 45°.

FIG. 3 shows such a connection: two main elements 9, in this case two 45° arcuate segments, are welded to one another to form a 90° arcuate-angle element, and the required connection elements 3 are joined on at the two ends.

Figure 4:
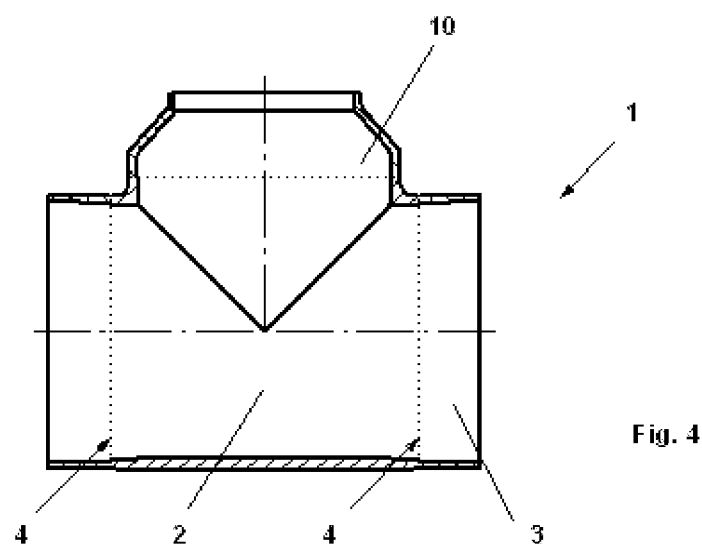
FIG. 4 shows a longitudinal section through a T-shaped main element to which a reducing connection element and two rectilinear connection elements have been welded.

FIG. 4 illustrates a fitting 1, which, as connection element, has a welded-on reducing connection element 10, which can be connected to a line which has a smaller diameter than the line running at right angles thereto. A rectilinear connection element 3 is fitted on each of the other two end surfaces 4 of the T-shaped main element 2. Other connection elements 3 would also have been possible.

Figure 5:
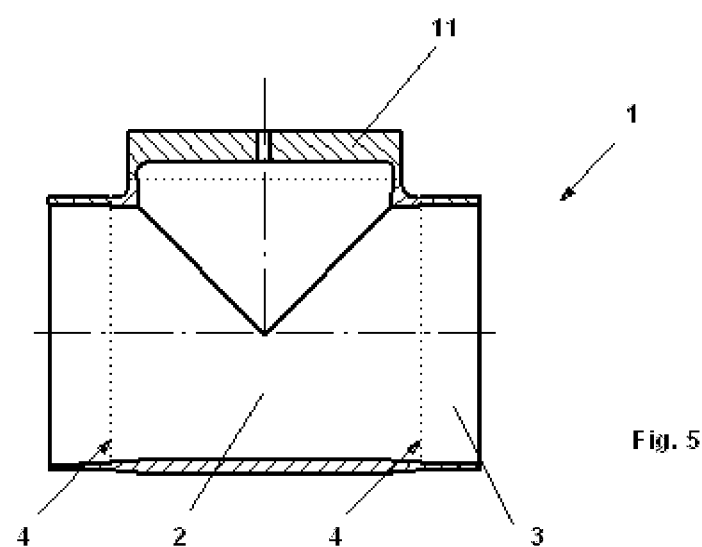
FIG. 5 shows a longitudinal section through a T-shaped main element to which an instrument connection element and two rectilinear connection elements have been joined.

A further connection element 3 is illustrated in FIG. 5. Here too, the T-shaped main element 2 has welded to it a specially designed connection element 11, this one being suitable for the connection of instruments, for example flow sensors or temperature sensors. It would also be possible here for the instrument connection element 11 to be fitted on another main element 2 or for yet further instrument connection elements 11 to be welded to the main element 2.

Figure 6:
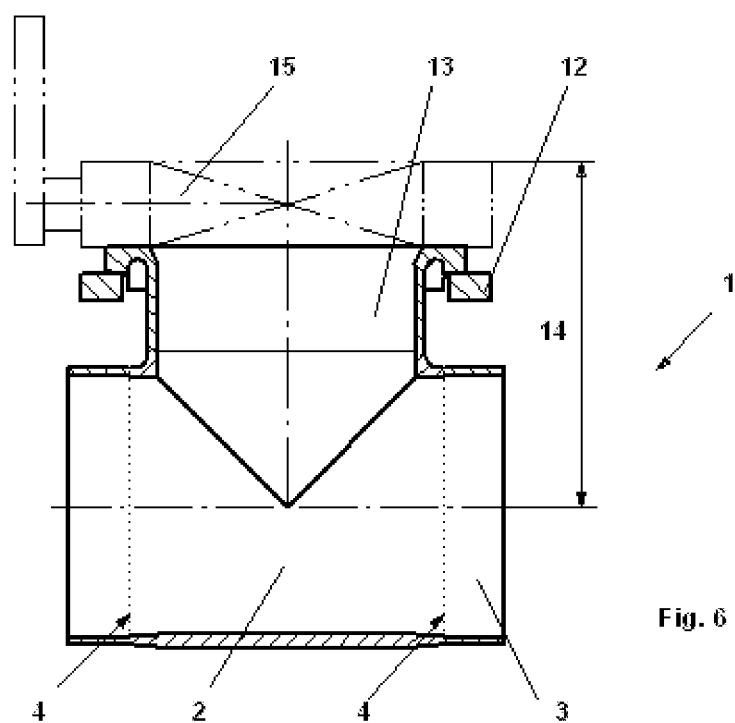
FIG. 6 shows a longitudinal section through a T-shaped main element to which a welding neck with flange and two rectilinear connection elements have been welded.

FIG. 6 shows a modular fitting which has a T-shaped main element 2. A rectilinear connection element 3 is arranged on each of the opposite end sides 4 of said main element 2. The connection which is offset through 90° has a welding neck with flange 12 and/or a preassembly connection element welded directly to the main element 2, it being possible for welding neck or preassembly connection element to be welded directly to the main element 2 without any intermediate component being required. It is thus possible for the distance 14 between the center axis 8 and the end surface of the welding neck 12 of the connection offset through 90° to be kept very small, which has a positive effect on the dead space 13 and/or on the stagnant medium in a branch which does not have constant flow through it. The distance 14 is usually shorter than the nominal diameter of the corresponding fitting. A relatively small dead space 13 results in less stagnant water forming. The stagnant water arises, as shown in FIG. 6, as a result of the adjacent butterfly valve 15 being closed and the branch thus having no flow through it. Of course, other fittings or further connectable components are also conceivable. It is correspondingly the case with these components that a preassembly connection element is produced and welded to the main element 2.

The invention claimed is:

1. An assembly comprising:
    a fitting (1) made of weldable, thermoplastic material and having a modular construction, comprising a plurality of elements (2, 3, 9, 10, 11, 12), including at least one main element (2, 9) and at least one connection element (3, 10, 11, 12), wherein:
        the plurality of elements (2, 3, 9, 10, 11, 12) each have end surfaces (4, 5) not along end flanges and running at right angles to a center axis (8),
        each said connection element (3, 10, 11, 12) is of the same diameter at its said end surface,
        a wall thickness of the connection element (3, 10, 11, 12) is thicker in a region of its said end surface than in a region of an opposite end surface (6) of the connection element, said opposite end surface for connection to an associated pipeline component, and
        the plurality of elements (2, 3, 9, 10, 11, 12) are directly welded to one another exclusively on the end surfaces; and
    pipeline components welded to the respective associated opposite end surfaces.

2. The assembly as claimed in claim 1 wherein the fitting (1) is produced from a plastic material selected from the group consisting of PVDF, PP, PE, PVC, ABS, PB, PA, PFA, and ECTFE.

3. The assembly of claim 1 comprising two said pipeline components.

4. An assembly comprising:
    a fitting (1) made of weldable, thermoplastic material and having a modular construction, comprising a plurality of elements (2, 3, 9, 10, 11, 12), including at least one main element (2, 9) and at least one connection element (3, 10, 11, 12), wherein:
        the plurality of elements (2, 3, 9, 10, 11, 12) each have end surfaces (4, 5) not along end flanges and running at right angles to a center axis (8),
        each said connection element (3, 10, 11, 12) is of the same diameter at its said end surface,
        a wall thickness of the connection element (3, 10, 11, 12) is thicker in a region of its said end surface than in a region of an opposite end surface (6) of the connection element, and
        the at least one connection element is directly welded to the at least one main element exclusively on the end surfaces, and at least one pipeline component welded to said opposite end surface of an associated said connection element.

5. The assembly as claimed in claim 4 wherein the fitting (1) has a minimum nominal diameter of 300 mm.

6. The assembly as claimed in claim 5, wherein the main element (2) is T-shaped.

7. The assembly as claimed in claim 4 wherein the fitting (1) is produced from a plastic material selected from the group consisting of PVDF, PP, PE, PVC, ABS, PB, PA, PFA, and ECTFE.

8. The assembly as claimed in claim 7, wherein a distance (14) which extends between the end surfaces of a preassembly connection element and/or a welding neck (12) which is one of the plurality of elements to the center axis (8), running parallel thereto, is shorter than the nominal diameter of the corresponding fitting.

9. The assembly as claimed in claim 7 wherein: the main element (2) is T-shaped; or the main element (9) is of arcuate design.

10. The assembly as claimed in claim 9, wherein the end surfaces (4, 5) of the plurality of elements (2, 3, 9, 10, 11) are round.

11. The assembly as claimed in claim 9, wherein the fitting (1) has a minimum nominal diameter of 300 mm.

12. The assembly as claimed in claim 4 wherein the main element (9) is of arcuate design, and forms an arcuate segment of up to 45°.

13. The assembly as claimed in claim 4 wherein the plurality of connection elements (3) are designed in the form of one of (a) a rectilinear connection element (3), (b) a reducing connection element (10), (c) an instrument connection element (11) or (d) a welding neck with flange (12).

14. The assembly as claimed in claim 4, wherein the end surfaces (4, 5) of the plurality of elements (2, 3, 9, 10, 11) are round.

15. The assembly of claim 4 comprising two said pipeline components.

16. The assembly as claimed in claim 4 wherein:
the main element (2, 9) has a central portion even thicker than the thick portion of the connection element (3, 10, 11, 12).

17. A method for assembling pipeline components, the method comprising:
forming a fitting (1) made of weldable, thermoplastic material from a plurality of elements (2, 3, 9, 10, 11, 12), including at least one main element (2, 9) and at least one connection element (3, 10, 11, 12), wherein:
the plurality of elements (2, 3, 9, 10, 11, 12) each have end surfaces (4, 5) not along end flanges and running at right angles to a center axis (8),
each said connection element (3, 10, 11, 12) is of the same diameter at its said end surface,
a wall thickness of the connection element (3, 10, 11, 12) is thicker in a region of its said end surface than in a region of an opposite end surface (6) of the connection element, and
the forming comprising directly welding the at least one connection element to the at least one main element exclusively on the end surfaces, and,
welding each of a plurality of pipeline components to said opposite end surface of a respective associated said connection element.

18. The method as claimed in claim 17, wherein the end surfaces (4, 5) of the plurality of elements (2, 3, 9, 10, 11) are round.

* * * * *